United States Patent
Razaviyayn et al.

(10) Patent No.: US 9,054,767 B2
(45) Date of Patent: Jun. 9, 2015

(54) ROBUST TRANSCEIVER DESIGN

(75) Inventors: Meisam Razaviyayn, Minneapolis, MN (US); Mohammadhadi Baligh, Ottawa (CA); Aaron Callard, Ottawa (CA); Zhi-Quan Luo, Maple Grove, MN (US)

(73) Assignee: Futurewei Technologies, Inc., Plano, TX (US)

( * ) Notice: Subject to any disclaimer, the term of this patent is extended or adjusted under 35 U.S.C. 154(b) by 287 days.

(21) Appl. No.: 13/556,973

(22) Filed: Jul. 24, 2012

(65) Prior Publication Data

US 2013/0078927 A1 Mar. 28, 2013

Related U.S. Application Data

(60) Provisional application No. 61/539,844, filed on Sep. 27, 2011.

(51) Int. Cl.
- *H04B 1/38* (2006.01)
- *H04B 7/08* (2006.01)
- *H04B 7/04* (2006.01)

(52) U.S. Cl.
CPC .............. *H04B 7/086* (2013.01); *H04B 7/0413* (2013.01)

(58) Field of Classification Search
CPC .. H04B 7/0413; H04B 7/0426; H04B 7/0452; H04B 7/0456; H04B 7/0465; H04B 7/086
USPC ........ 455/73, 81, 101, 562.1, 575.7; 375/267; 370/310, 317, 334
See application file for complete search history.

(56) References Cited

U.S. PATENT DOCUMENTS

| | | | |
|---|---|---|---|
| 7,443,925 B2* | 10/2008 | Mehta et al. | 375/299 |
| 8,488,725 B2* | 7/2013 | Yuan et al. | 375/346 |
| 8,687,741 B1* | 4/2014 | Erell | 375/340 |
| 2004/0242162 A1 | 12/2004 | Lau | |
| 2005/0075081 A1* | 4/2005 | Catreux-Erceg et al. | 455/78 |
| 2009/0160707 A1 | 6/2009 | Lakkis | |

FOREIGN PATENT DOCUMENTS

| | | |
|---|---|---|
| CN | 1868147 A | 11/2006 |
| CN | 101904109 A | 12/2010 |

OTHER PUBLICATIONS

Serbetli, Semih et al., "MMSE Transmitter Design for Correlated MIMO Systems with Imperfect Channel Estimates: Power Allocation Trade-offs", IEEE Transactions on Wireless Communications, vol. 5, No. 8, Aug. 2006.

(Continued)

*Primary Examiner* — Nay A Maung
*Assistant Examiner* — Angelica M Perez

(57) ABSTRACT

A system is provided for optimizing throughput in a communication system. During operation, the system receives, at a first antenna, estimated channel state information (CSI) at least one channel between the first antenna and at least one second antenna. The system obtains antenna correlation information associated with the first antenna and the second antenna, respectively. The system further calculates a set of noise terms associated with random noise for the at least one channel, and optimizes a configuration of beamformers for the first antenna and the at least one second antenna that maximizes a throughput of all antennas, in accordance with the estimated CSI, the obtained antenna correlation information, and the noise terms.

27 Claims, 6 Drawing Sheets

(56) References Cited

OTHER PUBLICATIONS

Ding, Minhua et al., "MIMO Minimum Total MSE Transceiver Design With Imperfect CSI at Both Ends", IEEE Transactions on Signal Processing, vol. 57, No. 3, Mar. 2009.

Shiu, Da-Shan et al., "Fading Correlation and Its Effect on the Capacity of Multielement Antenna Systems", IEEE Transactions on Communications, vol. 48, No. 3, Mar. 2000.

Tresch, Roland et al., "Cellular Interference Alignment with Imperfect Channel Knowledge", 2009.

Gomadam, Krishna et al., "Approaching the Capacity of Wireless Networks through Distributed Interference Alignment", 2008.

Shi, Qingjiang et al., "An Iteratively Weighted MMSE Approach to Distributed Sum-Utility Maximization for a MIMO Interfering Broadcast Channel", IEEE Transactions on Signal Processing, vol. 59, No. 9, Sep. 2011.

Medard, Muriel "The Effect upon Channel Capacity in Wireless Communications of Perfect and Imperfect Knowledge of the Channel", IEEE Transactions on Information Theory, vol. 46, No. 3, May 2000.

* cited by examiner

ROBUST TRANSCEIVER DESIGN

RELATED APPLICATION

This application claims the benefit of U.S. Provisional Application No. 61/539,844, entitled "Robust Transceiver Design" by inventors Zhi-Quan Luo, Mohammadhadi Baligh, and Aaron Callard, filed 27 Sep. 2011.

BACKGROUND

1. Field

This disclosure is generally related to transceiver design. More specifically, this disclosure is related to designing a robust transceiver using imperfect channel state information (CSI).

2. Related Art

Multiple-input-multiple-output (MIMO) systems have tremendous potential in increasing the average throughput in cellular wireless communication systems. The performance gain in channel capacity, reliability, and spectral efficiency in single user (point-to-point) MIMO (SU-MIMO) systems has spurred the inclusion of SU-MIMO in various cellular and wireless communication standards. In cellular networks where spectrum scarcity/cost is a major concern, the ability to reuse spectrum resources is critically important. Such systems, however, have to deal with the additional problem of inter-cell interference which does not exist in simple point-to-point systems. Interference is becoming one of the major bottlenecks limiting the throughput in wireless communication networks.

Traditionally, the problem of interference has been dealt with through careful planning and (mostly static) radio resource management. With the widespread popularity of wireless devices following different wireless communication standards, the efficacy of such interference avoidance solutions is fairly limited. Indeed, major standardization bodies are now including explicit interference coordination strategies in the latest standards. In particular, multiple-input multiple-output (MIMO) Interference Channel (MIMO-IFC) models communication channels having multiple transmitter-receiver pairs, each equipped with multiple antennas. In a MIMO-IFC, each transmitter transmits independent data streams to its intended receiver while causing interference to others. To reduce interference and to maximize system throughput, one approach is to design linear beamformers using channel state information (CSI). In practice, however, perfect CSI is not available at the transmitter side due to the estimation and quantization errors.

SUMMARY

One embodiment of the present invention provides a system for maximizing throughput in a communication system. During operation, the system receives, at a first antenna, estimated channel state information (CSI) for at least one channel between the first antenna and at least one second antenna. The system obtains antenna correlation information associated with the first antenna and the second antenna, respectively. The system further calculates a set of noise terms associated with random noise for the at least one channel, and optimizes a configuration of beamformers for the first antenna and the at least one second antenna that maximizes a throughput of all antennas, in accordance with the estimated channel state information, the obtained antenna correlation information, and the noise terms.

In a variation on this embodiment, the first antenna is a transmitting antenna, and/or the at least one second antenna is a receiving antenna.

In a variation on this embodiment, the optimizing includes determining the configuration of the beamformers that maximizes a weighted sum rate of all transmitting-receiving antenna pairs.

In a further variation, the optimizing includes determining the configuration of the beamformers that maximizes a weighted sum of lower bounds of mutual information between transmitted and received signals.

In a further variation, the optimizing includes determining the configuration of the beamformers that minimizes a weighted sum of mean-square-errors (MSEs) of estimated data streams received at the at least one second antenna. An MSE of a respective estimated data stream is associated with a corresponding transmit beamformer, a corresponding receive beamformer, the estimated CSI, and the random noise.

In a further variation, the optimizing involves a coordinate descent method, in which a beamformer associated with the first antenna and a beamformer associated with the at least one second antenna are updated separately and iteratively.

In a further variation, the system updates a set of intermediate variables, which are functions of the configuration of the beamformers and the estimated CSI.

In a further variation, the optimizing repeats until convergence of the configuration of the beamformers.

In a variation on this embodiment, optimizing the configuration of the beamformers can be performed asynchronously among transmitting-receiving antenna pairs.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method for designing robust beamformers for MIMO-IFC. During operation, each node (e.g., a base station in a cellular network) estimates the CSI, which includes covariance matrices of the MIMO channels and antenna correlation information. To maximize the overall system throughput, the system maximizes a weighted sum of the lower bounds of the mutual information. This is equivalent to the problem of minimizing the weighted sum of the mean square errors (MSEs) of the estimated signals. In one embodiment, the system solves the optimization problem by using a coordinate descent method. More specifically, the system performs the optimization by iteratively updating the transmit and receive beamformers for all users until it reaches a convergence threshold. During each update, the transmitters and receivers exchange intermediate parameters associated with the updated beamformers.

In this disclosure, the term "node" refers to an entity in the network capable of sending, receiving, or forwarding information over a communication channel. In a wireless communication network, a node can refer to a base station (such as an LTE eNode-B), which serves as the hub of a local network, or a piece of user equipment (UE).

In this disclosure, the term "channel" refers to a wireless link between a transmitting entity and a receiving entity. Depending on the circumstance, a channel can refer to a wireless link between a transmitting antenna and a receiving antenna, or a channel can refer to a wireless link between a transmitting node and a receiving node, where each node may include multiple antennas. Channel state information (CSI) for a channel can be expressed by a corresponding channel matrix.

Models and Formulations

MIMO technology has attracted much attention in wireless communications, because it offers significant increases in data throughput and link range without additional bandwidth or increased transmit power. It achieves this goal by spreading the same total transmit power over multiple antennas. MIMO, particularly multi-user MIMO (MU-MIMO), technology has been an integral part of the Long Term Evolution (LTE) standards as specified in the 3GPP (3rd Generation Partnership Project) releases, which are available at the 3GPP website (www.3GPP.org).

Figure 1A:
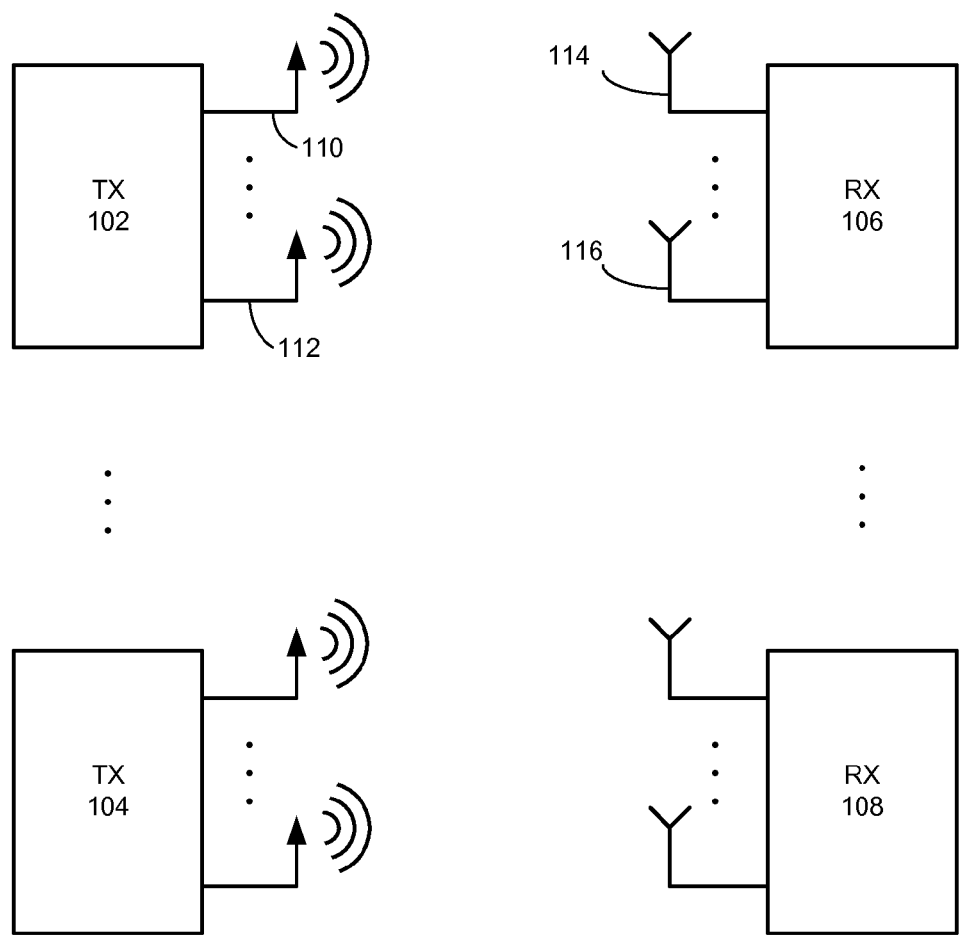
FIG. 1A presents a diagram illustrating an exemplary block diagram of a multi-user MIMO (MU-MIMO) system.

FIG. 1A presents a diagram illustrating an exemplary block diagram of a multi-user MIMO (MU-MIMO) system. MU-MIMO system 100 includes a number of transmitters, such as transmitters 102 and 104, and a number of receivers, such as receivers 106 and 108. Each transmitter or receiver includes a number of antennas. For example, transmitter 102 includes antennas 110 and 112, and receiver 106 includes antennas 114 and 116. Note that signals sent from each transmitting antenna are received by every receiving antenna. Consequently, while transmitting signals to its intended receiver, a transmitter generates interference noise at other receivers.

Beamforming is a technology used to create a radiation pattern of an antenna array. It takes advantage of interference to change the directionality of the antenna array. When transmitting, a beamformer controls the phase and the relative amplitude of the signal at each transmitter, in order to create a pattern of constructive and destructive interference at the wavefront. When receiving, signals from different receivers are combined in a way such that the expected pattern of radiation is preferentially observed. An adaptive beamformer is able to automatically adapt its response to different situations, such as situations with changing channel fading, thus being a preferred candidate for next-generation wireless communications. Note that 3GPP (3rd Generation Partnership Project) Release 8 specifies beamforming as part of the LTE (long term evolution) standard.

Figure 1B:
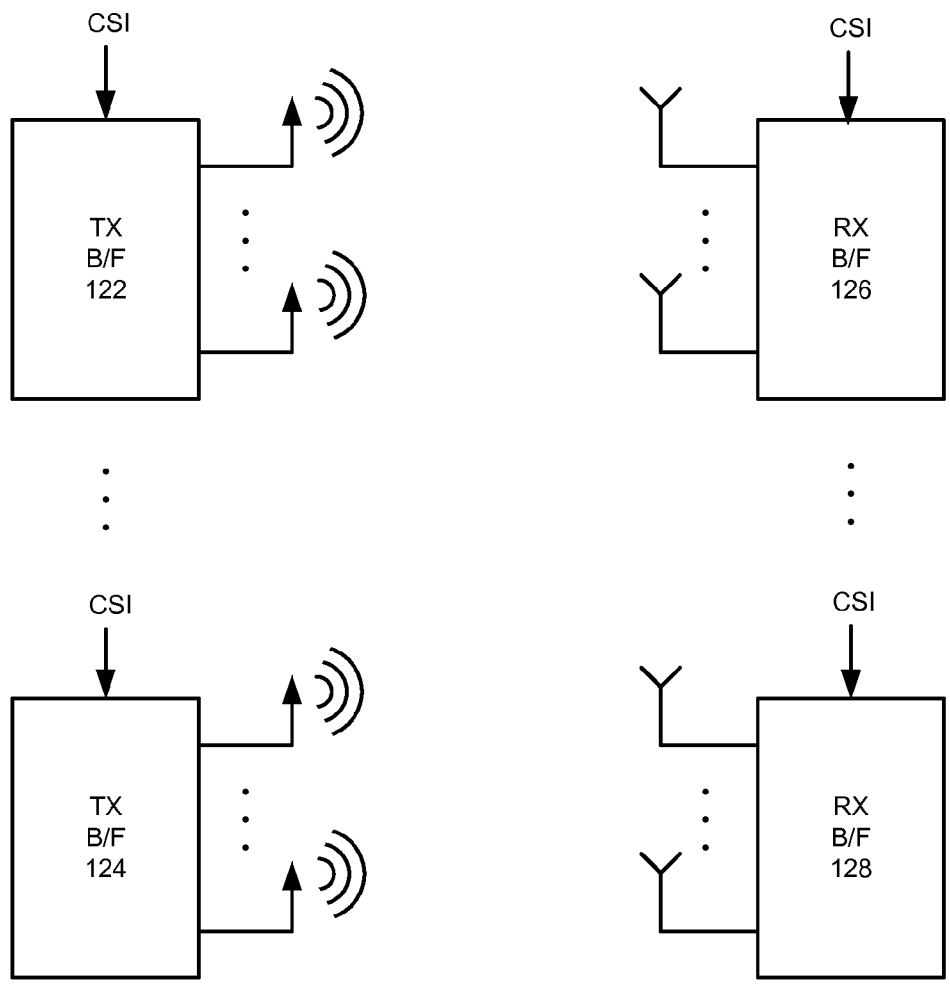
FIG. 1B presents a diagram illustrating an exemplary block diagram of a multi-user MIMO (MU-MIMO) system equipped with beamformers.

FIG. 1B presents a diagram illustrating an exemplary block diagram of a multi-user MIMO (MU-MIMO) system equipped with beamformers. In FIG. 1B, MU-MIMO system 120 includes a number of transmitting beamformers, such as TX beamformers 122 and 124, and a number of receiving beamformers, such as RX beamformers 126 and 128. Each TX beamformer receives CSI and controls the phase and the relative amplitude of the transmitted signals at each antenna based on the CSI. Each RX beamformer controls how signals received at each antenna are combined. Note that to maximize the system throughput, the beamformers need to be aware of the exact CSI. However, at the transmitter side, perfect CSI knowledge is unavailable, and one has to be able to optimize the beamformers based on an estimation of the CSI.

Figure 1C:
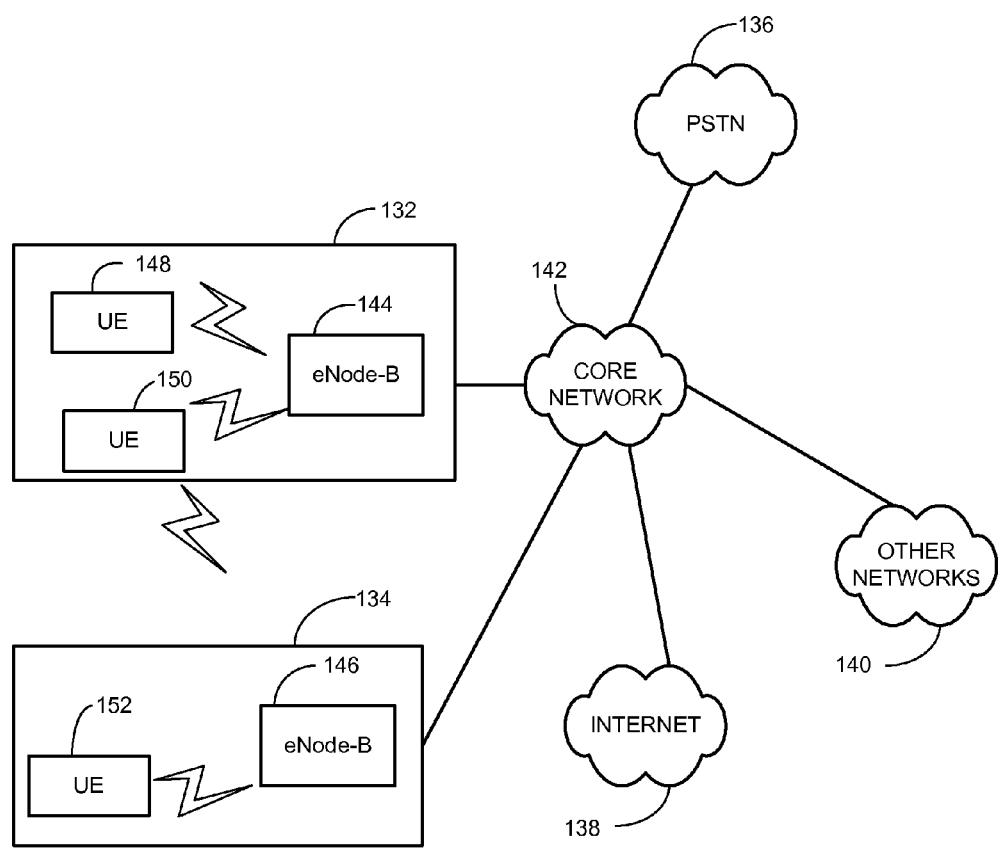
FIG. 1C presents a diagram illustrating a simplified view of an exemplary wireless communication system.

FIG. 1C presents a diagram illustrating a simplified view of an exemplary wireless communication system. In FIG. 1C, a number of base stations (such as LTE eNode-Bs 144 and 146) are coupled to the public switched telephone network (PSTN) 136, the Internet 138, and other networks (such as network 140) via a core network 142. Each eNode-B communicates with a number of UEs via an air interface. For example, eNode-B 144 communicates with UEs 148 and 150 within cell 132, and eNode-B 116 communicates with a UE 152 within cell 134. According to LTE standards, the communication between the eNode-Bs and the UEs is accomplished using various MIMO transmission techniques.

Although the present disclosure is presented using examples based on the LTE standards, embodiments of the present invention are not limited to LTE networks. The principles demonstrated by embodiments of the present invention are also applicable to other types of network that implements MIMO transmission technologies, including, but are not limited to: WiFi, WiMAX (Worldwide Interoperability for Microwave Access), and HSPA+(High-Speed Packet Access Plus).

For an MU-MIMO system with K users, using a channel model with antenna correlation, the channel matrix $H_{kj}$, which represents the channel from transmitter j to receiver k, can be expressed as:

$$H_{kj} = L_{kj}^{\frac{1}{2}} \overline{H}_{kj} R_{kj}^{\frac{1}{2}}, \quad (1)$$

where $$L_{kj}^{\frac{1}{2}} \text{ and } R_{kj}^{\frac{1}{2}}$$

stand for the receive (antenna) correlation matrix and the transmit (antenna) correlation matrix, respectively; and both are assumed to be positive definite. The entries in matrix $\overline{H}_{kj}$ are independent and identically distributed (i.i.d) with $C\mathcal{N}(0, 1)$. During channel estimation, a user k simultaneously estimates a set of channel matrices, $H_{kj}$, j=1, 2, ..., K, using training power $P_j^{tr}$, resulting in:

$$H_{kj} = \hat{H}_{kj} + E_{kj}, k, j=1,2, \ldots K, \quad (2)$$

where $H_{kj}$ is the true channel matrix, $\hat{H}_{kj}$ is the estimated channel matrix, and $$E_{kj} = L_{e,kj}^{\frac{1}{2}} \overline{E}_{kj} R_{kj}^{\frac{1}{2}}$$

is the channel estimation error. Note that $$L_{e,kj}^{\frac{1}{2}} = (I + \sigma_{kj}^2 L_{kj}^{-1})^{-1}$$

with $$\sigma_{kj}^2 = Tr(R_{kj}^{-1})\frac{\sigma_k^2}{P_j^{tr}},$$

and the entries of $\bar{E}_{kj}$ are i.i.d with distribution $C\,\mathcal{N}\,(0, \sigma_{kj}^2)$. Note that $\sigma_k^2$ is the noise variance at user k.

Based on the channel estimation model described in Eq. (2), for a MIMO IFC, the received signal vector at user k, $y_k$, can be expressed as:

$$y_k = \hat{H}_{kk}x_k + \sum_{j \neq k}\hat{H}_{kj}x_j + \sum_{j=1}^{K}E_{kj}x_j + n_k, \quad (3)$$

where $x_k$ is the transmitted signal of user k, and $n_k$ is the additive white Gaussain noise (AWGN) at user k with distribution $C\,\mathcal{N}\,(0, \sigma_k^2 I)$. It is assumed that signals from different users are independent from each other and from receiver noises. When the transmit beamformer is applied, the transmitted signal of user k, $x_k$, can be written as: $x_k = V_k s_k$, where $V_k$ is the transmit beamformer of user k, and $s_k$ is the data to be transmitted. It is assumed that $E[s_k s_k^H] = I$. Similarly, when the receive beamformer is applied, the estimated data at receiver k is given by $\hat{s}_k = U_k^H y_k$.

It is desirable to design beamformers $\{V_k, U_k\}_{k=1}^K$ that can maximize the system performance, such as the weighted sum rate of all users, while the power budget of each transmitter is respected. However, it is difficult to compute a closed form expression of the maximal mutual information of the transmitted and received signals, $I(x_k; y_k | \hat{H})$, where $\hat{H}$ denotes the set of all estimated channel matrices $\{\hat{H}_{kj}\}_{j,k}$. It has been shown that the mutual information between the transmitted and received signals is lower bounded by:

$$R_k^{lb} = \frac{1}{2}\mathrm{logdet}\left(I + \hat{H}_{kk}V_k V_k^H \hat{H}_{kk}^H(\sigma_k^2 I + INT + N_k)^{-1}\right), \quad (4)$$

where $V_k^H$ and $\hat{H}_{kk}^H$ are the Hermitian transposes of $V_k$ and $\hat{H}_{kk}$, respectively; INT is the interference with $$INT = \sum_{j \neq k}\hat{H}_{kj}V_j V_j^H \hat{H}_{kj}^H;$$

and $$N_k = \sum_{j=1}^{K}\sigma_{kj}^2 Tr(R_{kj}V_j V_j^H)L_{e,kj}$$

contains the antenna correlation information and is associated with channel noise. $N_k$ and $\sigma_k^2 I$ together form a noise term in addition to the interference term INT in Eq. (4) Note that this lower bound does not depend on the actual value of the channel (or the true channel matrix), making a robust solution possible. Hence, the robust weighted-sum-rate-maximization (WSRM) formulation can be obtained by maximizing the weighted sum of this lower bound. Specifically, the WSRM optimization problem can be formulated as:

$$\overset{max}{V_1, \ldots, V_K} \sum_{k=1}^{K}\alpha_k \mathrm{logdet}\left(I + \hat{H}_{kk}V_k V_k^H \hat{H}_{kk}^H(\sigma_k^2 I + INT + N_k)^{-1}\right) \quad (5)$$

$$\text{s.t.} \quad Tr(V_k V_k^H) \leq P_k, \quad \forall k.$$

In formula (5), $\alpha_k$ is the weight of user k, and $P_k$ is power budget of transmitter k. This problem is NP-hard because it is as hard as the non-robust problem where the channel estimation errors are zeros (or equivalently $\sigma_{kj}=0$, $\forall k,j$). By treating the effect of channel estimation error as an extra interference term, one can define a virtual MIMO IFC where the estimated data stream of user k is given by:

$$\hat{s}_k = U_k^H\left(\hat{H}_{kk}V_k s_k + \sum_{j \neq k}\hat{H}_{kj}V_j s_j + \sum_{j=1}^{K}E_{kj}V_j s_j + n_k\right), \quad (6)$$

where $U_k$ is the receive beamformer of user k. Hence, the mean square error (MSE) matrix of the estimated data can be defined as:

$$\hat{E}_k \triangleq E_{s,E,n}((\hat{s}_k - s_k)(\hat{s}_k - s_k)^H) \quad (7)$$

$$= I - U_k^H \hat{H}_{kk}V_k - V_k^H \hat{H}_{kk}^H U_k + \sum_{j=1}^{K}U_k^H \hat{H}_{kj}V_j V_j^H \hat{H}_{kj}^H U_k +$$

$$\sum_{j=1}^{K}\sigma_{kj}^2 Tr(R_{kj}V_j V_j^H)U_k^H L_{e,kj}U_k + \sigma_k^2 U_k^H U_k.$$

It can be shown that the WSRM optimization problem is equivalent to a weighted-sum mean squared error (WMMSE) minimization problem. More specifically, formula (5) can be proved to be equivalent to:

$$\overset{min}{\{W_k, U_k, V_k\}_{k=1}^K} \sum_{k=1}^{K}\alpha_k\left(TR(W_k \hat{E}_k) - \mathrm{logdet}(W_k)\right), \quad (8)$$

$$\text{s.t.} \quad Tr(V_k V_k^H) \leq P_k, \quad W_k \geq 0 \;\forall k$$

in the sense that the global optimal solution $\{V_k^*\}$ for the two problems are identical. Moreover, if $\{V_k^*, U_k^*, W_k^*\}$ is a stationary point of (8), then $\{V_k^*\}$ is a stationary point of (5).

Optimization

Various methods can be used to solve the optimization problem described by formula (8). In one embodiment, the optimization problem of formula (8) is solved using a coordinate descend method. In a further embodiment, $\{W_k\}_{k=1}^K$ and $\{V_k\}_{k=1}^K$ are first fixed, and the objective function of formula (8) becomes a convex quadratic function for $\{U_k\}_{k=1}^K$. By checking the first order optimality condition, the optimal receive beamformer can be obtained as:

$$U_k^* = \left(\sum_{j=1}^{k}\hat{H}_{kj}V_j V_j^H \hat{H}_{kj}^H + \sigma_k^2 I + N_k\right)^{-1}\hat{H}_{kk}V_k, \quad \forall k. \quad (9)$$

Similarly, fixing $\{V_k\}_{k=1}^K$ and $\{U_k\}_{k=1}^K$, the optimal value of $\{W_k\}_{k=1}^K$, also known as the weight matrices, can be obtained as:

$$W_k^* = \hat{E}_k^{-1} = (1 - U_k^{*H}\hat{H}_{kk}V_k)^{-1}, \forall k. \quad (10)$$

Fixing $\{W_k\}_{k=1}^{K}$ and $\{U_k\}_{k=1}^{K}$ in (8), one gets a quadratic objective function with a quadratic constraint. In one embodiment, the system uses the Lagrange multiplier method to obtain the optimal $\{V_k\}_{k=1}^{K}$ as:

$$V_k^* = \left(\sum_{j=1}^{K} \alpha_j \hat{H}_{jk}^H U_j W_j U_j^H \hat{H}_{jk} + \mu_k I + M_k\right)^{-1} \alpha_k \hat{H}_{kk} U_k W_k, \quad (11)$$

$\forall k,$ where $$M_k = \sum_{j=1}^{K} \sigma_{kj}^2 Tr(\alpha_j U_j W_j U_j^H L_{e,kj}) R_{jk},$$

and $\mu_k$ can be obtained by one dimensional line search methods such as bisection.

By iteratively updating the receive beamformer $\{U_k\}_{k=1}^{K}$, the weight matrices $\{W_k\}_{k=1}^{K}$, and the transmit beamformer $\{V_k\}_{k=1}^{K}$ until convergence, one can obtain the optimized beamformers at both the transmitter side and the receiver side. It has been shown by simulation that this algorithm converges in a few iterations because only three blocks of variables are involved. Note that the number of blocks is independent of the number of users. Consequently, the algorithm converges faster and requires less overhead compared to other optimization approaches.

To implement the WMMSE algorithm, each node needs to have CSI knowledge of the coupled channels or the system assumes time division duplex (TDD) channel reciprocity. In addition, each node needs to know the covariance matrices of the coupled channels. Alternatively, each node knows its own covariance matrices, and the transmitters and receivers send their correlation matrices along with the most recent updates of Eqs. (9)-(11) to all neighbors. Note that the neighbors of a transmitter are the set of receivers, to which the transmitter causes interference; and the neighbors of a receiver are the set of transmitters that cause interference to the receiver. In the event that a node only has partial CSI knowledge, the node can guess the missing information using historical data or certain predefined terms. For example, in case that a correlation matrix of a node is unknown, an identity matrix can be used as an estimation of the correlation matrix.

Figure 2:
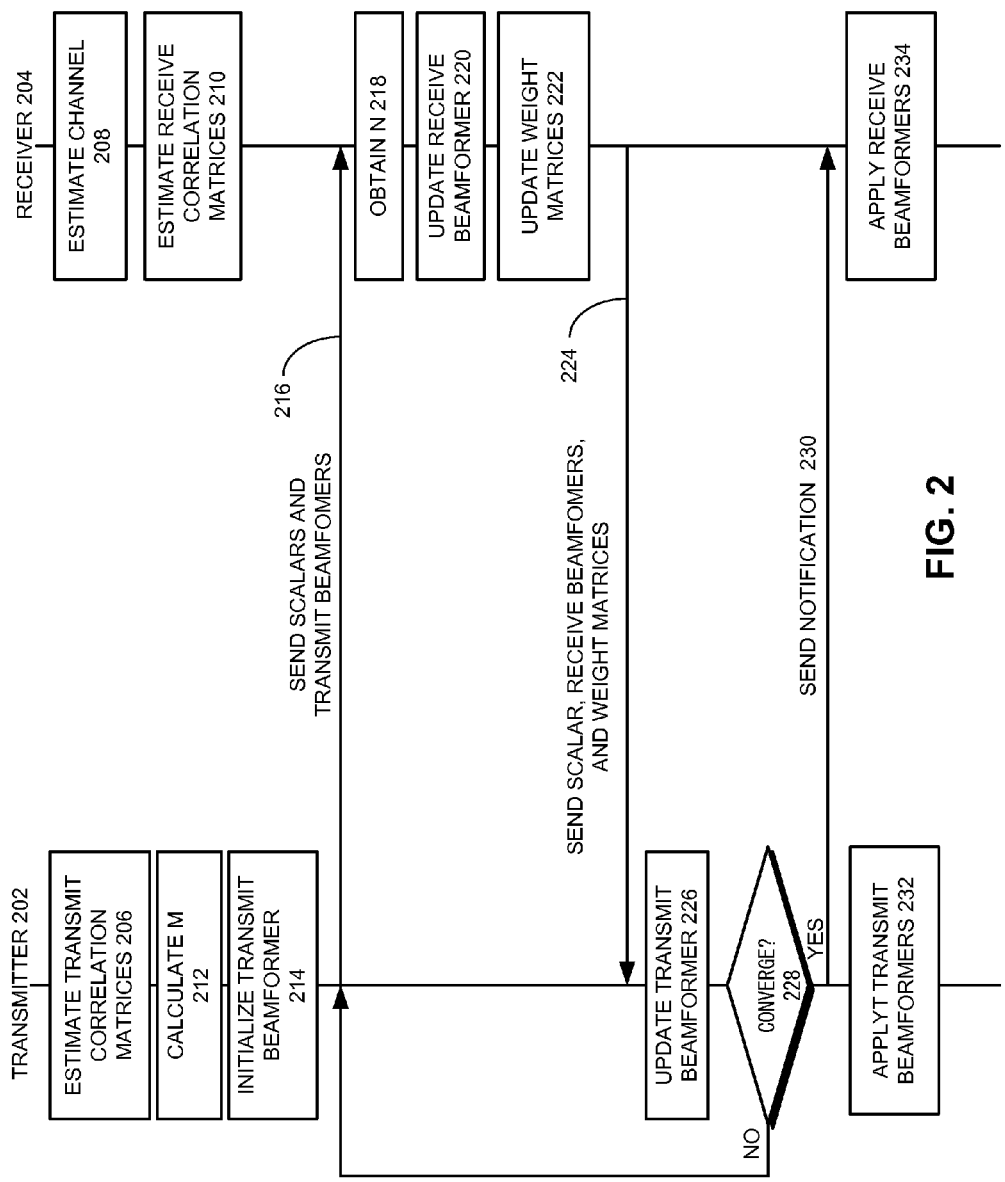
FIG. 2 presents a time-space diagram illustrating the process of obtaining optimal transmit and receive beamformers in an MU-MIMO system, in accordance with an embodiment of the present invention.

FIG. 2 presents a time-space diagram illustrating the process of obtaining optimal transmit and receive beamformers in an MU-MIMO system, in accordance with an embodiment of the present invention. During operation, all transmitters in the MU-MIMO system, including the $i_{th}$ transmitter 202, estimate the transmit correlation matrices for all neighbors (operation 206). For example, $i_{th}$ transmitter 202 estimates the transmit antenna correlation matrix $R_{ki}$ for its $k_{th}$ neighbor. In the meantime, all receivers, including $j_{th}$ receiver 204, estimate the channel values (channel matrices H) (operation 208), and the receive correlation matrices for all neighbors (operation 210). For example, $j_{th}$ receiver 204 estimates the receive antenna correlation matrix $L_{jk}$ for its $k_{th}$ neighbor. Subsequently, the transmitters calculate the intermediate matrices M (operation 212), and initialize or update the corresponding transmit beamformers V (operation 214). For example, transmitter i calculates $M_i$, and updates $V_i$. In one embodiment, the transmitters initialize the transmit beamformers by ensuring that they meet the power budget requirement. For example, transmitter i initializes $V_i$ such that $Tr(V_i V_i^H) = P_i$. The transmitters then send two scalars $$\frac{Tr(R^{-1})}{P^{tr}}$$

and $Tr(RVV^H)$, and the updated V to all of its neighbors (operation 216). For example, transmitter i sends scalars $$\frac{Tr(R_{ki}^{-1})}{P_i^{tr}}$$

and $Tr(R_{ki} V_i V_i^H)$ to all neighbors. The receivers use the received scalars to compute $\sigma$ and $L_e$, thus obtaining N (operation 218), and update corresponding receive beamformers U (operation 220). For example, receiver j uses scalars received from transmitter k to compute $\sigma_{kj}$ and $L_{e,kj}$, thus obtaining $N_j$, and updates $U_j$ accordingly. In one embodiment, updating the receive beamformer involves calculating an optimal receive beamformer according to Eq. (9).

Subsequently, the receivers use the updated transmit and receive beamformers to update the intermediate weight matrices, W (operation 222). For example, receiver j uses updated $V_j$ and $U_j$ to update $W_j$. In one embodiment, updating the weight matrices involves calculating an optimal weight matrix according to Eq. (10). The receivers then send a scalar, $\sigma Tr(UWU^H L_e)$, and the updated U and W to all transmitters (operation 224). For example, receiver j sends $\sigma_{jk} Tr(U_j W_j U_j^H L_{e,kj})$ to all transmitters. Upon receiving the feedback from all the receivers, the transmitters update the corresponding transmit beamformers using the feedback (operation 226). For example, transmitter i updates $V_i$. In one embodiment, updating the transmit beamformer involves calculating an optimal transmit beamformer according to Eq. (11).

After each round of update of the transmit beamformers, the transmitters determine whether a convergence is achieved (operation 228). For example, the transmitters can determine if the difference between the newly updated beamformers and the previous beamformers is less than a predetermine threshold. If so, the transmitters send a notification to the receivers (operation 230) and apply the converged transmit beamformers (operation 232). The receivers apply the most recently updated receive beamformers (operation 234). If not, the transmitters return to operation 216, where the updated transmit beamformers are sent to the receivers. Operations 218-228 repeat until the convergence is achieved.

Figure 3:
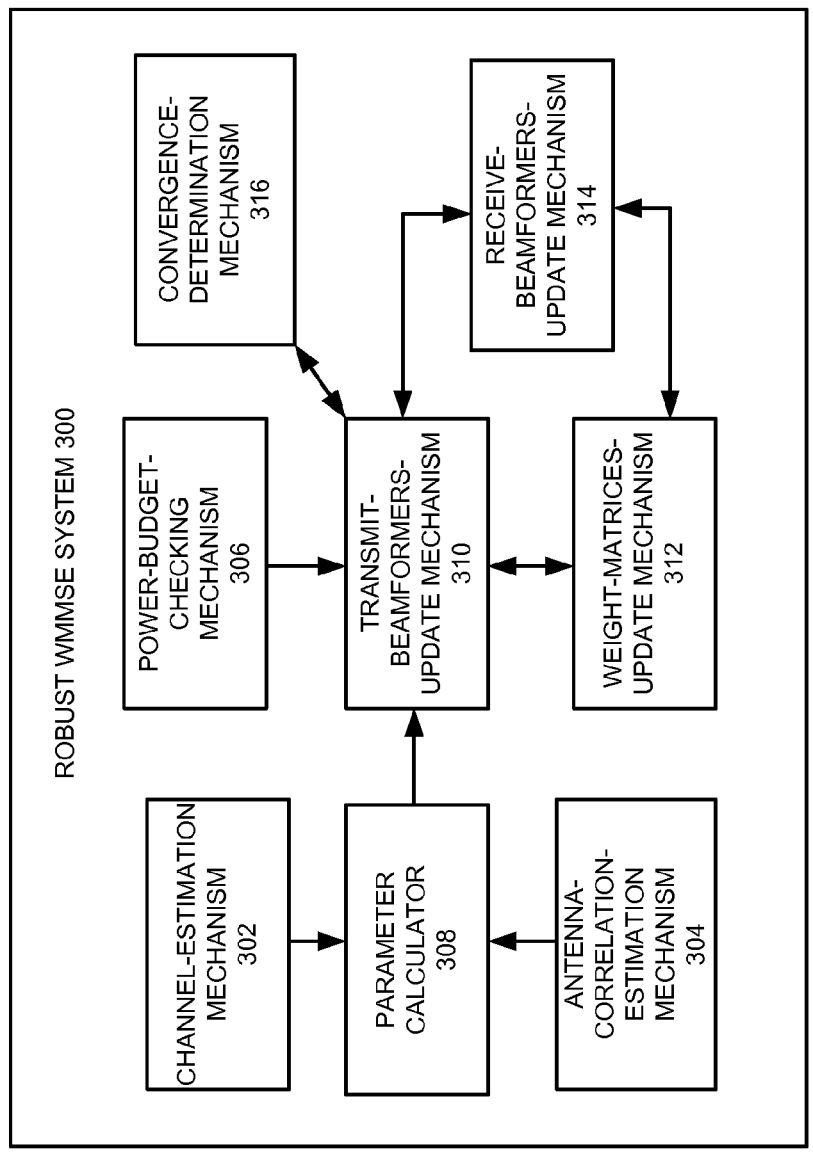
FIG. 3 illustrates an exemplary system for achieving robust weighted-sum MSE minimization (WMMSE), in accordance with an embodiment of the present invention.

FIG. 3 illustrates an exemplary system for achieving robust weighted-sum MSE minimization (WMMSE) in an MU-MIMO, in accordance with an embodiment of the present invention. A robust WMMSE 300 system includes a channel-estimation mechanism 302, an antenna-correlation-estimation mechanism 304, a power-budget-checking mechanism 306, a parameter calculator 308, a transmit-beamformers-update mechanism 310, a weight-matrices-update mechanism 312, a receive-beamformers-update mechanism 314, and a convergence-determination mechanism 316.

Channel-estimation mechanism 302 is responsible for estimating the CSI, and antenna-correlation-estimation mechanism 304 is responsible for estimating the transmit and the receive antenna correlation information. In one embodiment, estimation of the CSI involves estimating the channel matrices between transmitter and receiver pairs. In a further embodiment, estimating the CSI involves receiving feedback to CSI reference signals from the UEs. The UEs report reference signal received power (RSRP) and reference signal received quality (RSRQ) for the CSI-reference signals to the base stations. The downlink CSI may include a channel quality indication (CQI), a precoding matrix index (PMI), and a rank indicator (RI). During operation, the estimated channel and antenna correlation matrices are sent to parameter calculator 308, which calculates the intermediate and auxiliary parameters that are used in the optimization of the beamformers. Power-budget-checking mechanism 306 makes sure that the power budget requirement for each node is met.

To maximize the weighted sum rate, robust WMMSE system 300 minimizes the weighted sum of the MSE. In one embodiment, the optimization process uses a coordinate descent method, which is performed by transmit-beamformers-update mechanism 310, receive-beamformers-update mechanism 314, along with the help of weight-matrices-update mechanism 312. More specifically, using Eqs. (9)-(11), transmit-beamformers-update mechanism 310, receive-beamformers-update mechanism 314, and weight-matrices-update mechanism 312 update the three set of variables (the transmit beamformers, the receive beamformers, and the weight matrices) one set at a time by fixing the values of the other two sets. In one embodiment, transmit-beamformers-update mechanism 310 first initializes the transmit beamformers using the power budget of each node, and receive-beamformers-update mechanism 314 calculates the optimal receive beamformers using the initial transmit beamformers, according to Eq. (9). Weight-matrices update mechanism 312 calculates the optimal weight-matrices using the available transmit and receive beamformers, according to EQ. (10). Subsequently, the optimal receive beamformers and weight matrices are used by transmit-beamformers-update mechanism 310 to update the optimal values of the transmit beamformers, according to EQ. (11). This process repeats itself until convergence-determination mechanism 316 determines that convergence has been reached.

Figure 4:
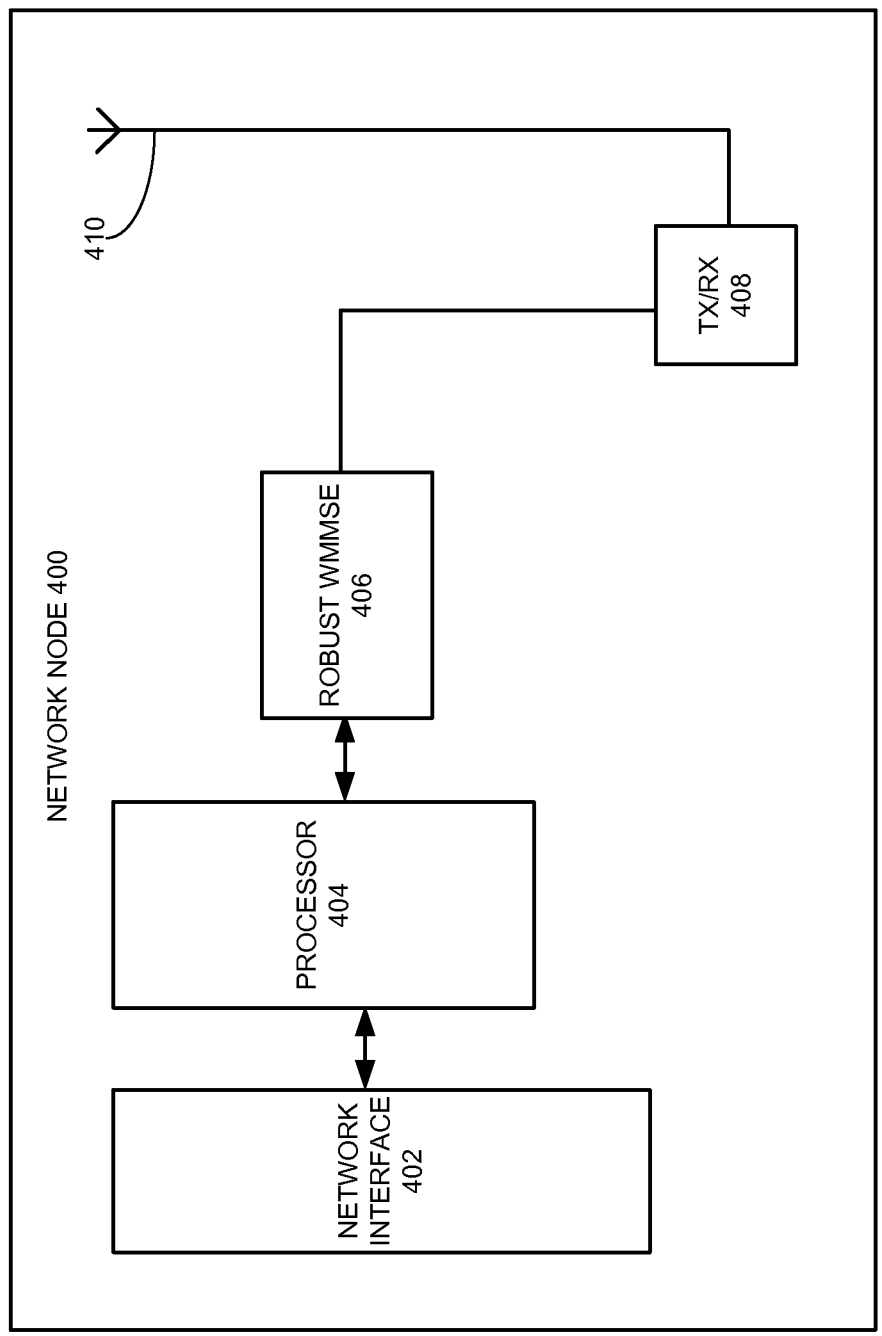
FIG. 4 presents a diagram illustrating the architecture of an exemplary node in an MU-MIMO system, in accordance with an embodiment of the present invention.

FIG. 4 presents a diagram illustrating the architecture of an exemplary node in an MU-MIMO system, in accordance with an embodiment of the present invention. A network node 400 includes a network interface 402, a processor 404, a robust WMMSE module 406, a transceiver 408, and an antenna 410. During operation, network node 400 interacts with the core network via network interface 402. Processor 404 executes applications for robust WMMSE module 406. Transceiver 408 receives uplink signals from and transmits downlink signals to other nodes via antenna 410. While transmitting downlink signals, transceiver 408 applies the beamformers outputted from robust WMMSE module 406.

Embodiments of the present invention provide a robust way of designing beamformers in a MIMO IFC. More specifically, the system uses channel correlation knowledge to maximize a lower bound of the weighted sum rate of all users, which can be obtained using estimated channel values. In one embodiment, the stationary point of the lower bound of the WSRM problem can be solved by finding the stationary point of the WMMSE problem. In a further embodiment, a coordinate descent method is used where the transmit and receive beamformers are iteratively updated with the help of an auxiliary variable, known as the weight matrices. Note that, because only three blocks of variables (the transmit beamformers, the receive beamformers, and the weight matrices) are involved in the optimization, convergence can be reached within a few iterations. Actually the number of variable blocks is independent of the number of users, making this solution converging faster and requiring less overhead. In addition, because updates of the variables only depend on local channel knowledge, for example, update of the transmit beamformer of a user does not depend on the transmit beamformer of other users (as shown by Eq. (11)), it is possible to perform the optimization in an asynchronous manner. In one embodiment, different nodes asynchronously update their transmit or receive beamformers. Moreover, other than checking whether the transmit beamformers converge, the system can also determine whether the receive beamformers converge and stop the iterations once the receive beamformers converge.

On the other hand, other approaches either provide poor system performance or require synchronization among nodes. For example, the greedy approach, where every user updates its transmitter in a selfish manner, often cannot converge and performs poorly for high interference cases; and the interference pricing method, where every transmitter considers the effect of its transmit beamformer to itself as well as an approximate effect to others, requires synchronous operation of all users and large overhead, and is computationally expensive.

Note that the process shown in FIG. 2 and the block diagrams shown in FIGS. 3 and 4 are merely exemplary and should not limit the scope of this disclosure. For example, in FIG. 2, the system first optimize the receive beamformers using initialized transmit beamformers. In practice, it is also possible to first optimize the transmit beamformers. In addition, calculations of the intermediate parameters, such as the scalars $$\frac{Tr(R^{-1})}{P^{tr}},$$

$Tr(RVV^H)$, and $\sigma Tr(UWU^H L_e)$ can be performed at either the transmitter or receiver side, given the antenna correlation information are known to both sides. In addition, the robust WMMSE system may have more or fewer components than the one shown in FIG. 3. For example, the parameter calculator may be part of the transmit-beamformers-update mechanism or part of the receive-beamformers-update mechanism.

Moreover, the method for designing transmit and receive beamformers used in embodiments of the present invention is not limited to applications in MIMO systems. The same principle can be applied to a multiple-input single-output (MISO) system as well as a single-input single-output system.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
receiving, at a first antenna, estimated channel state information (CSI) for at least one channel between the first antenna and at least one second antenna;
obtaining antenna correlation information associated with the first antenna and the at least one second antenna, respectively;
calculating a set of noise terms associated with random noise for the at least one channel; and
optimizing a configuration of beamformers for the first antenna and the at least one second antenna that maximizes a throughput of all antennas, in accordance with the estimated CSI, the obtained antenna correlation information, and the noise terms.

2. The method of claim 1, wherein the first antenna is a transmitting antenna, and the at least one second antenna is a receiving antenna.

3. The method of claim 1, wherein the optimizing includes determining the configuration of the beamformers that maximizes a weighted sum rate of all transmitting-receiving antenna pairs.

4. The method of claim 3, wherein the optimizing includes determining the configuration of the beamformers that maximizes a weighted sum of lower bounds of mutual information between transmitted and received signals.

5. The method of claim 3, wherein the optimizing includes determining the configuration of the beamformers that minimizes a weighted sum of mean-square-errors (MSEs) of estimated data streams received at the at least one second antenna, and wherein an MSE of a respective estimated data stream is associated with a corresponding transmit beamformer, a corresponding receive beamformer, the estimated CSI, and the random noise.

6. The method of claim 5, wherein the optimizing involves a coordinate descent method, in which a beamformer associated with the first antenna and a beamformer associated with the at least one second antenna are updated separately and iteratively.

7. The method of claim 6, further comprising updating a set of intermediate variables, which are functions of the configuration of the beamformers and the estimated CSI.

8. The method of claim 6, further comprising repeating the optimizing until convergence of the configuration of the beamformers.

9. The method of claim 1, wherein optimizing the configuration of the beamformers can be performed asynchronously among transmitting-receiving antenna pairs.

10. A system comprising:
a first antenna;
a processor; and
a non-transitory storage medium storing instructions for execution by the processor,
wherein the processor is configured to:
receive estimated channel state information (CSI) received at the first antenna for at least one channel between the first antenna and at least one second antenna;
obtain antenna correlation information associated with the first antenna and the at least one second antenna, respectively;
calculate a set of noise terms associated with random noise for the at least one channel; and
optimize a configuration of beamformers for the first antenna and the at least one second antenna that maximizes a throughput of all antennas, in accordance with the estimated CSI, the obtained antenna correlation information, and the noise terms.

11. The system of claim 10, wherein the first antenna is a transmitting antenna, wherein and the at least one second antenna is a receiving antenna.

12. The system of claim 10, wherein the optimizing includes determining the configuration of the beamformers that maximizes a weighted sum rate of all transmitting-receiving antenna pairs.

13. The system of claim 12, wherein the optimizing includes determining the configuration of the beamformers that maximizes a weighted sum of lower bounds of mutual information between transmitted and received signals.

14. The system of claim 12, wherein the optimizing includes determining the configuration of the beamformers that minimizes a weighted sum of mean-square-errors (MSEs) of estimated data streams received at the at least one second antenna, and wherein an MSE of a respective estimated data stream is associated with a corresponding transmit beamformer, a corresponding receive beamformer, the estimated CSI, and the random noise.

15. The system of claim 14, wherein the optimizing involves a coordinate descent method, in which a beamformer associated with the first antenna and a beamformer associated with the at least one second antenna are updated separately and iteratively.

16. The system of claim 15, wherein the processor is further configured to update a set of intermediate variables, which are functions of the configuration of the beamformers and the estimated CSI.

17. The system of claim 15, wherein the the processor is further configured to repeat the optimizing until convergence of the configuration of the beamformers.

18. The system of claim 10, wherein optimizing the configuration of the beamformers can be performed asynchronously among transmitting-receiving antenna pairs.

19. A network node, comprising:
a CSI-receiving mechanism configured to receive estimated channel state information (CSI) for at least one channel between a first antenna and at least one second antenna;
an obtaining mechanism configured to obtain antenna correlation information associated with the first antenna and the at least one second antenna, respectively;
a noise-term-calculator configured to calculate a set of noise terms associated with random noise for the at least one channel; and
an optimization mechanism configured to optimize a configuration of beamformers for the first antenna and the at least one second antenna that maximizes a throughput of all antennas, in accordance with the estimated CSI, the obtained antenna correlation information, and the noise terms.

20. The node of claim 19, wherein the first antenna is a transmitting antenna, and the at least one second antenna is a receiving antenna.

21. The node of claim 19, wherein the throughput is measured by a weighted sum rate of all transmitter-receiver pairs in the system.

22. The node of claim 21, wherein the optimization mechanism is configured to maximize a weighted sum of lower bounds of mutual information between transmitted and received signals.

23. The node of claim 21, wherein the optimization mechanism is configured to minimize a weighted sum of mean-square-errors (MSEs) of estimated data streams received at the at least one second antenna, and wherein an MSE of a respective estimated data stream is associated with a corresponding transmit beamformer, a corresponding receive beamformer, the estimated CSI, and the random noise.

24. The node of claim 23, wherein the optimization mechanism is configured to use a coordinate descent method, which comprises:
   receiving updates of receive beamformers from other nodes in the system; and updating the beamformer corresponding to the node using the received updates of the receive beamformers.

25. The node of claim 23, wherein while optimizing the configuration of beamformers, the optimization mechanism is configured to receive updates of a set of intermediate variables, which are functions of the configuration of the beamformers and the estimated CSI.

26. The node of claim 24, wherein the optimization mechanism is configured to repeat the optimizing until convergence of the configuration of the beamformers.

27. The node of claim 19, wherein the optimization mechanism is configured to optimize the configuration of the beamformers associated with the node asynchronously with respect to other nodes.

* * * * *